United States Patent [19]

Trautmann

[11] Patent Number: 4,961,668

[45] Date of Patent: Oct. 9, 1990

[54] QUICK-RELEASE HUB ASSEMBLY FOR MOUNTING A WHEEL ELEMENT TO A SHAFT

[75] Inventor: Hugh M. Trautmann, Renfrew, Pa.

[73] Assignee: Billco Manufacturing, Inc., Zelienople, Pa.

[21] Appl. No.: 429,196

[22] Filed: Oct. 30, 1989

[51] Int. Cl.$^5$ .......................... F16B 2/02; F16D 1/00
[52] U.S. Cl. .................... 403/351; 403/365; 403/366
[58] Field of Search ................ 403/350, 351, DIG. 8, 403/365, 366, 370, 371

[56] References Cited

U.S. PATENT DOCUMENTS

| 827,267 | 7/1906 | Schmidt | 403/350 |
|---|---|---|---|
| 3,124,370 | 3/1964 | Traugott | 280/661 |
| 3,368,834 | 2/1968 | Stratienko | 403/352 |

Primary Examiner—Andrew V. Kundrat
Attorney, Agent, or Firm—George C. Atwell

[57] ABSTRACT

A hub assembly comprising a pair of hub members, each having a tubular body or bushing portion which is centrally bored to enable the hub members to be slid onto a shaft or axle of uniform circular cross-section. The hub members are adapted to be disposed on the shaft to support a wheel element, and their tubular bodies are adapted to be interfitted one in the other, thus establishing an annular seat for the wheel element. One of the tubular bodies in insertably slidably received into a substantially large bore of the other tubular body and both tubular bodies are configured such that they bindingly lock to each other and to the shaft as a function of limited manual rotation of one hub member relative to the other. Reverse rotation acts to release the locking action.

9 Claims, 2 Drawing Sheets

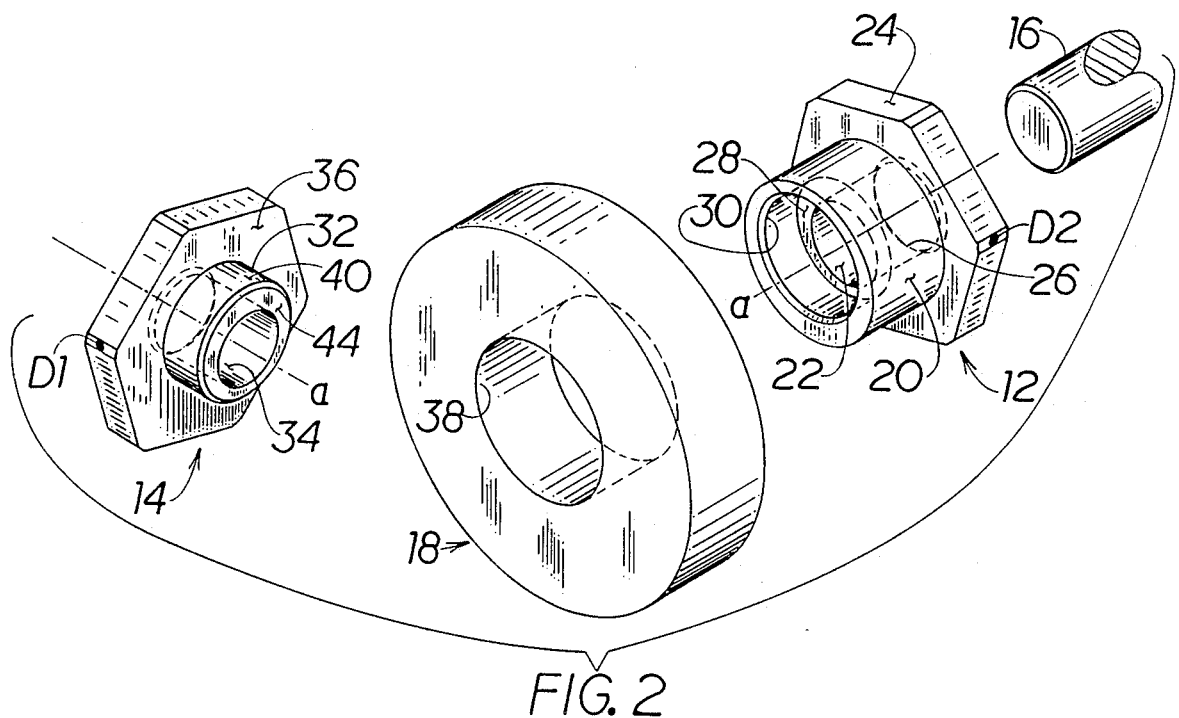
FIG. 2
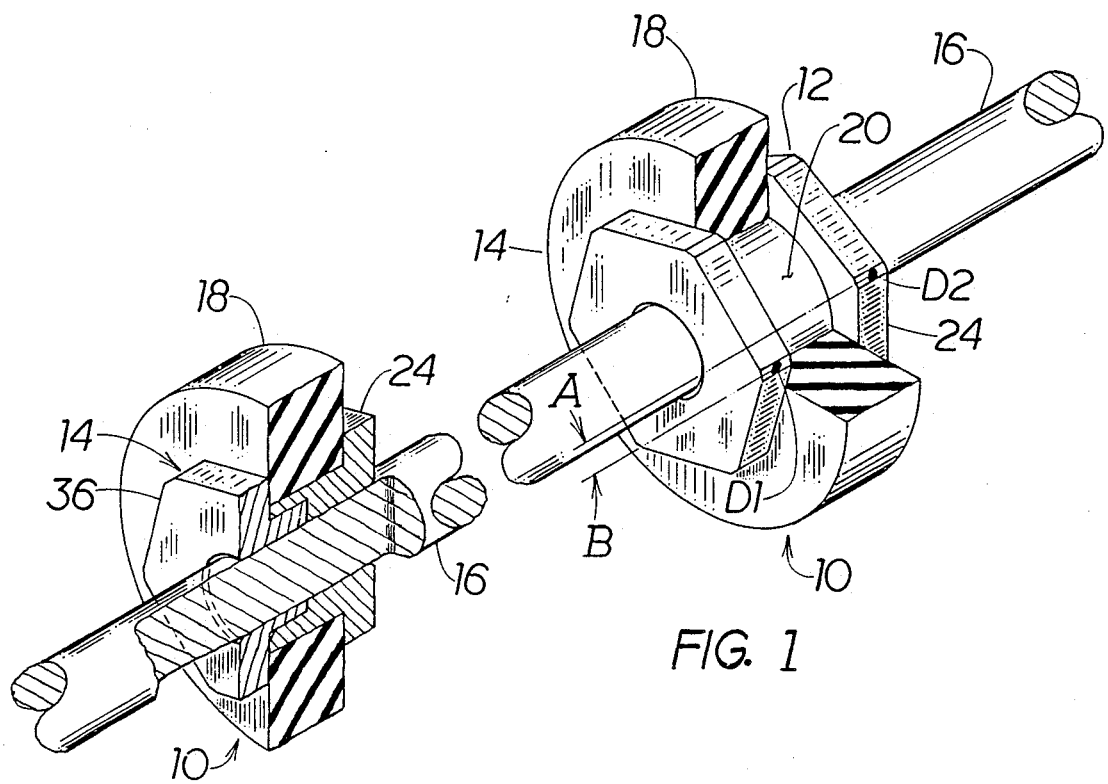
FIG. 1
FIG. 3

QUICK-RELEASE HUB ASSEMBLY FOR MOUNTING A WHEEL ELEMENT TO A SHAFT

BACKGROUND OF THE INVENTION

This invention relates generally to means for mounting a wheel element on a rotatable shaft, and more particularly pertains to a hub assembly for mountably securing a wheel element for rotation in unison with a shaft or axle.

There are many machine applications wherein wheels of one type or another are mounted for rotation on a shaft or axle. One such application is found in conveyors for sheet material wherein sheets are successively fed onto a conveying apparatus and moved through one or more treating zones. An example of such conveyance equipment is that which is used in conveying large sheets or panels of glass in a horizontal pathway through successive washing and drying zones. The conveying apparatus may comprise a series of spaced-apart horizontal driven shafts disposed transverse to the direction of conveyance. On each shaft may be secured resilient tires or rollers, in spaced-apart relation, which rotate with the shafts on which they are mounted and supportably drive the glass sheets, edge first, in a predetermined horizontal pathway through which the sheets are successively subjected to washing, rinsing, and air drying steps of the cleaning process. The tires or rollers can be affixed to the shafts on hubs having mechanical means, such as a key and keyway or a radially-oriented set screw to bind the hub to the shaft.

In such conveyance equipment as heretofore described, it is often necessary to relocate the rollers along the length of the shafts on which they are carried, consistent with different sizes of sheets to be conveyed for treatment. Hence, there is a need for a rapid means of releasing the hub on which a roller is carried on the shaft, from its binding engagement with the shaft, whereby the roller may be slid to a new position along the shaft length and then resecured in binding locked dispostion on the shaft.

SUMMARY OF THE INVENTION

The present invention comprehends the provision of a hub assembly for securing a resilient roller or similar wheel element on a shaft of uniform circular cross-section wherein the hub assembly may be easily manually locked into its operative mode to be thereby driven in unison with the shaft. Provision is made in the hub assembly of the present invention for quickly releasing it from its binding engagement with the shaft to permit it to be slid and repositioned longitudinally on the shaft and then quickly relocked in its new operative position.

The structure of the invention is a hub assembly comprising first and second hub members for slidable mounting dispostion to an operative position on a shaft, with each hub member having a tubular body with a bore defined by an inner annular surface concentric with the bore's axis in a diameter enabling the hub member to be snugly fitted on the shaft. The tubular body of the first hub member has an outer annular surface which is eccentric to the axis of its central bore. The tubular body of the second hub member has an outer annular wheel element supporting surface concentric to its bore axis and an eccentric bore portion for insertably receiving the tubular body portion of the first hub member therein in a snug interfitting relationship. Limited rotation of one hub member relative to the other causes a binding action between the hub members and between each hub member and the shaft. Counter-rotation of the hub members back to their starting position acts to release the aforedescribed binding action.

In the preferred embodiment of the invention, each hub member has a rim portion, preferably in the form of a radially-outwardly projecting annular flange which is integral to one end of the hub member's tubular body when the hub members are interfitted to form the hub assembly unit. An annular seat area is formed between the rim portions for supporting the wheel element on the assembly.

In the mounted operative position of the hub assembly on the shaft, with the wheel element carried on the interfitted hub members, manual rotation of one hub member relative to the other causes occurrence of an internal camming action between the inner surface of the larger tubular body of one of the hub members and the outer surface of the smaller tubular body of the other hub member. This camming action serves to forceably bind the hub members to each other and to the shaft to thereby dispose the wheel element for rotation with the shaft.

The binding engagement of the hub assembly unit with the shaft can be easily defeated by halting rotation of the shaft and then manually rotating the hub members relative to each other in a direction opposite the before-described binding rotation whereby the hub assembly, with the wheel element secured thereon, can then be slid longitudinally along the shaft and relocked in a new operative position.

Specific objects and advantages of the present invention, as well as details of its structure and function, will become apparent from the ensuing detailed description when read in reference to the accompanying drawings which illustrate the presently preferred embodiment incorporating the principles of the invention.

Brief Description of the Drawings

FIG. 1 is a perspective view of the presently preferred embodiment of the invention as it would appear in its operative position, having a portion of one of its components cut away to reveal certain features of other components in the structure;

FIG. 2 is a perspective exploded view of the invention first shown in FIG. 1, here illustrating greater detail of the several conponents of the invention;

FIG. 3 is a perspective cut-away view of the invention embodiment first shown in FIGS. 1 and 2, illustrating additional internal structural characteristics;

DETAILED DESCRIPTION OF THE PREFERRED EMBODIMENT

Figure 4:
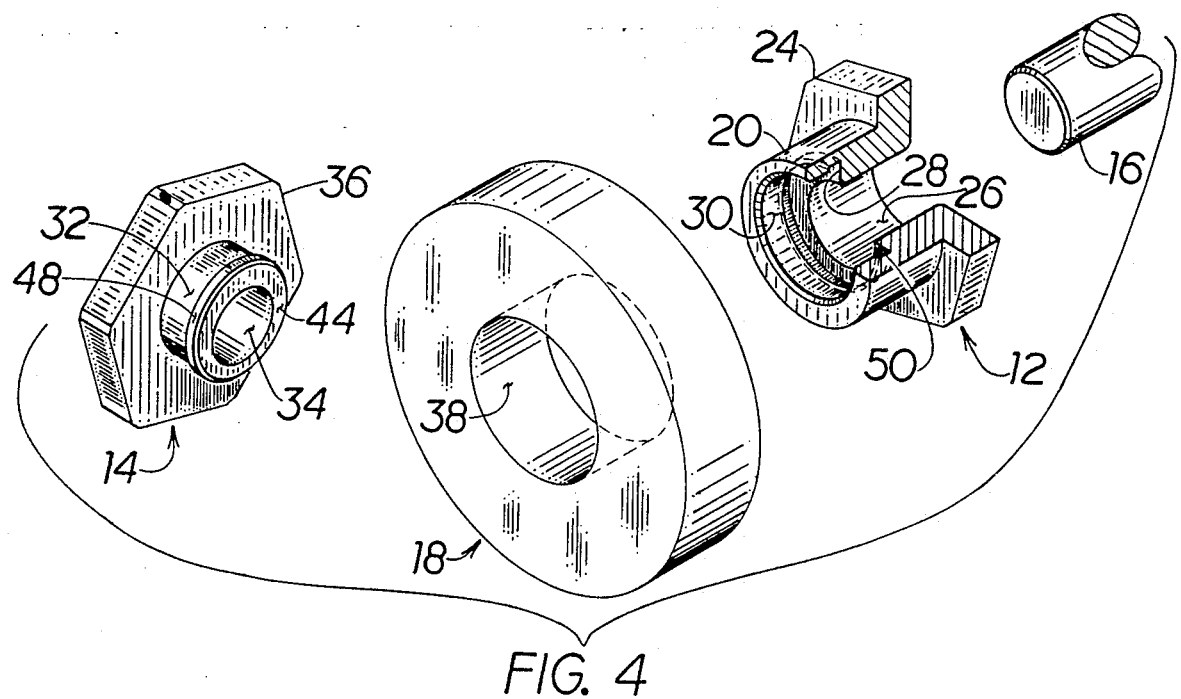
FIG. 4 is a perspective exploded view of an alternate embodiment of the invention.

As illustrated in FIG. 1, the presently preferred embodiment of the invention herein disclosed is a hub assembly 10 including a first hub member 12 and a second hub member 14. The hub members 12 and 14 are shown in their operative positions, forming a hub unit on shaft 16 and supporting a wheel element 18 for rotation in unison with shaft 16.

FIG. 2 shows that the hub element 12 has a tubular body 20 with a bore 22. The hub element 12 also has a flange-like rim portion 24 integral to the tubular body 20. The bore 22 comprises two successive sections. At the rim end of the hub member 12, a bore section 26 is concentric to the longitudinal axis of the member and extends from the face of rim 24 to an internal annular shoulder 28. Adjacent the shoulder 28 is a bore section 30 which is eccentric to the longitudinal axis of the member 12 and of a comparatively greater diameter than the diameter of the bore section 26.

Hub member 14, as shown in FIG. 2, has a stub-like tubular body portion 32 with an internal bore 34 which is concentric to the longitudinal axis "a" of the member 14. The outer circumferential surface of the tubular body 32 is eccentric to the axis "a". The hub member 14 also has a flange-like rim portion 36 integral to and projecting radially outward from one end of the body 32.

To mount the wheel 18 on the shaft 16, utilizing the hub members 12 and 14, the wheel 18 is mounted onto the tubular body 20 of hub member 12 whereby the central opening 38 of the wheel 18 slidably engages in snug registration on the outer circumferential surface of the body 20. The hub member 12, with the wheel 18 carried thereon, is then slid onto shaft 16 and, thereafter, hub member 14 is placed onto the shaft 16 whereby its tubular body 32 is insertably received within the bore section 30. Dots D1 and D2 are provided on the respective rim portions 36 and 24 of the hub members 14 and 12 to serve as visual indicators in properly aligning the hub members during their assembly whereby tubular body 32 will be easily insertably received within the bore section 30. The relatively thick sidewall area 40 of tubular body 32 must be immediately adjacent the relatively thin sidewall area 42 of tubular body 20 to enable the members 12 and 14 to be assembled whereby the faced end 44 of tubular body 32 will come to rest against the annular shoulder 28 within the bore 22 of tubular body 20. This is accomplished by having dots D1 and D2 in alignment on a line parallel to the axis of shaft 16, such line being indicated by broken line "A" in FIG. 1. Then, to lock the hub assembly in its operative position, the rim portions 12 and 14 may be grasped at their outer edges by the fingers of the operator who then rotates one hub member on the shaft relative to the other hub member a limited distance, corresponding to the distance between broken lines A and B in FIG. 1, whereby an internal locking camming action occurs between the outer surface of tubular body 32 and the annular innersurface of bore section 30.

FIG. 1 shows the disposition of the hub members 12 and 14 after the aforedescribed rotative locking action has occurred. The described internal camming action involves a concurrent forced slight lateral shifting of the hub members 12 and 14 relative to the shaft 16. This forced shifting results in a binding or jamming of the internal sidewall of tubular body 32 and bore section 26 against the shaft 16 surface whereby the entire hub assembly will secure the wheel 18 at the selected position along the length of shaft 16 until a manual releasing action is applied to the hub members. This is accomplished by a counter-rotation of hub member 12 relative to hub member 14 whereby the dot D1 would move back into alignment with dot D2, the distance of such movement being the distance between broken lines A and B shown in FIG. 1.

Having described the means of releasably locking or binding the hub assembly to the shaft 16, it should be recognized that release of the locking action which binds one hub member to the other and both to the shaft 16 can be accomplished by counter-rotation of the hub members 12 and 14 or by holding one member stationary while the other is rotated in either direction relative to the stationary member. Moreover, where the wheel or tire 18 is a snug fit on the outer surface of the tubular body 20, in the wheel seating area between the rim portions 24 and 36, as shown in FIGS. 1 and 3, the hub assembly locking or releasing action can be accomplished by manually holding the wheel 18 against rotative motion while the hub member 14 is rotated a short distance in either direction to effect or release the internal camming action heretofore described.

Figure 5:
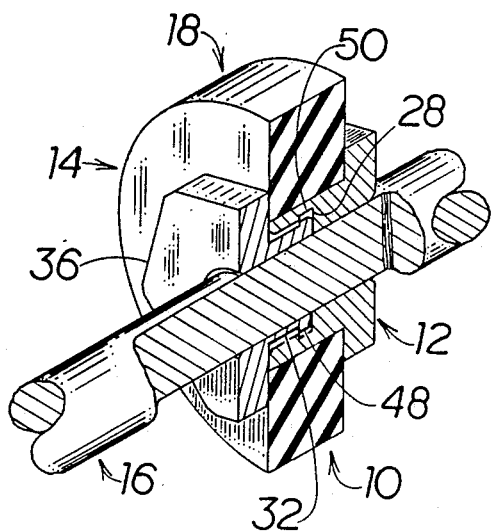
FIG. 5 is a perspective cut-away view of the alternate invention embodiment, illustrating the assembled operative disposition of the components first shown in FIG. 4.

FIGS. 4 and 5 illustrate an alternative embodiment of the present invention. This alternative embodiment is a modification of the preferred embodiment shown in FIGS. 1, 2, and 3, constituting the same parts or components as the earlier described embodiment except for some structural modifications which shall now be described.

As shown in FIG. 4, an annular ridge 48 is provided on the tubular body 32 of hub member 14, immediately adjacent the face end 44 of the tubular body 32. Within the bore section 30 of body portion 20 of hub member 12, an annular recess or groove 50 is provided adjacent the shoulder 28. Inasmuch as the diameter of the ridge 48 must be a slidable registration with the inner circumferential surface of bore section 30 when the hub members 12 and 14 are assembled, the diameter of tubular body 32, rearwardly of the ridge 48, must be reduced, as compared to the diameter of the tubular body of hub member 14 shown in FIG. 2, and such reduction is equal to the radial depth of the ridge 48.

When the hub members 12 and 14 are insertably interfitted to their operative position on shaft 16, in accordance with the embodiment shown in FIG. 4, the ridge 48 will align with the plane of groove 50. Performance of the rotative locking action of the hub members 12 and 14 relative to each other will cause a segment of ridge 48 to move into the groove 50 and thereby prevent any axial slippage or spreading separation of the hub members which might otherwise occur if unanticipated dynamic forces during use of the assembly should cause slight counter-rotation of the hub members relative to each other and a loosening of the internal locking camming action. By virtue of this construction, inadvertent partial release of the hub members relative to each other might permit the entire hub assembly 10, and the wheel 18 mounted thereon, to migrate along the shaft as a unit but will not permit full separation of the hub member components until such time as the hub members were relatively rotated to their original position of total cam disengagement.

Although the rim portions of the respective hub members 12 and 14 are shown, in both embodiments herein disclosed, as constituting substantially wide flanges with hex-shaped edge configurations, it is contemplated that these rim portions can be of substantially smaller diameter or that they may be circumferentially circular or otherwise variously configured. The hexigonal configuration of these rim portions is a means of facilitating application of a tool to accomplish the rotative locking and unlocking action of the hub members. While it has been determined that hand rotative tightening of the hub assembly on the shaft 16 is sufficient for most purposes, the binding force of the cam action can be significantly increased by utilization of wrenches or similar tools to tighten the hub members to each other and to the shaft, however, such firm tightening action cannot thereafter be released by hand manipulation and the proper tools must be applied to accomplish it.

In the construction of the hub members 12 and 14 of the hub assembly 10, the degrees of rotation required to achieve the aforedescribed locking action is primarily a function of two factors which can be selectively varied. One of these factors is the extent of eccentricity established for the bore section 30 of hub member 12 and the body portion 32 of hub member 14. The other factor is the amount of clearance provided between the adjacent surfaces of the respective interfitting components. If, for example, the fit between the shaft 16 and the respective hub member bores 34 and 26 is relatively loose, a correspondingly greater arc of rotation will be required to achieve the locking action between the hub members 12 and 14. Similarly, a loose fit between the inner surface of the female part or bore section 30 and the male part or body portion 32 will affect the operational characteristics of the hub assembly by requiring the hub members be rotated through a significantly greater arc to achieve the locking action or the release action.

Although an ideal set of parameters for the eccentric and clearance factors has not been established, it appears that maintaining a clearance of fit between the shaft 16 and the central bores 34 and 26, and between the female part 30 and the male part 32, fairly snug but, nevertheless, sufficiently loose to facilitate easy manual sliding of the interfitting parts relative to each other during assembly, results in an arc of rotation in the range of 40° to 45°. Narrower tolerances between the interfitting parts would lessen the arc of rotation whereas provision of the widest possible clearances between the sliding surfaces without losing the locking action will result in an arc of rotation of close to but always less than 180°.

In regard to clearance between the parts, it should be noted with reference to the alternative embodiment of the invention shown in FIGS. 4 and 5 that if the aforedescribed operational characteristics of this embodiment are to be achieved, then the clearance established between the outer surface of body portion 32 and the inner surface of bore 30 must necessarily be somewhat extreme in order to permit sliding passage of the lip or ridge 48 through the bore 30 and into the plane of the annular recess 50. This results in a comparatively greater arc of rotation to achieve lock-up and release as compared to that required with regard to the embodiment illustrated in FIGS. through 3.

Although the present invention has been heretofore described in connection with the presently preferred embodiment and one alternative embodiment, it is to be understood that other embodiments or variations may be made without departing from the spirit and scope of the invention, as those skilled in the art will readily understand. Such embodiments and variations are considered to be within the purview and scope of the invention and the appended claims.

I claim:

1. A hub assembly, for releasably securing a resilient wheel element on a rotatable shaft, comprising:
   first and second hub members for slidable mounting to an operative position on the shaft;
   each hub member having a tubular body with a bore defined by an inner annular surface concentric with the bore's axis and an inside diameter enabling the hub member to be snugly fitted on the shaft;
   the tubular body of the first hub member having an outer annular surface which is eccentric to the axis of its central bore;
   the tubular body of the second hub member having an outer annular wheel element supporting surface concentric to its bore axis and an eccentric bore portion for insertably receiving the tubular body portion of the first hub member therein in a snug interfitting relationship such that limited rotation of one hub member relative to the other causes a binding action between the hub members and between each hub member and the shaft, and counterrotation of the members releases the binding action; and
   the wheel element having a central opening defining an inner annular surface in snug registration on the wheel element supporting surface such that the binding and releasing actions between the hub members can be accomplished by manually gripping the wheel element to thereby control the rotation of the second hub member.

2. The hub assembly of claim 1 wherein at least one of the hub members has a rim portion integral to that member's tubular body.

3. The hub assembly of claim 1 wherein the second hub member has a rim portion integral to its tubular body and disposed outwardly adjacent the wheel element supporting surface.

4. The hub assembly of claim 2 wherein the rim portion is a radially-outwardly projecting flange.

5. The hub assembly of claim 1 wherein the binding action occurs as a function of counter-rotating one hub member relative to the other in either rotative direction.

6. The hub assembly of claim 2 wherein at least one rim portion is provided with tool engagement means to effect rotation of the hub member.

7. The hub assembly of claim 1 wherein each of the tubular bodies has, porjecting radially-outwardly from an end thereof, an integral annular flange of a diameter greater than the diameter of the tubular body from which it projects.

8. The hub assembly of claim 1 further including means interacting between the hub members to prevent sliding separation of the hub members during operative use of the hub assembly on the shaft.

9. The hub assembly of claim 8 wherein the tubular body of the first hub member has an annular ridge, and the tubular body of the second hub member has an internal annular groove disposed to engage the ridge when the hub members are rotated relative to each other to cause the binding action between them.

* * * * *